(12) United States Patent
Molter (10) Patent No.: US 9,425,578 B2
(45) Date of Patent: Aug. 23, 2016

(54) SHORT-PULSE LASER SYSTEM (71) Applicant: Fraunhofer-Gesellschaft zur Förderung der angewandten Forschung e.V., Munich (DE)

(72) Inventor: Daniel Molter, Kaiserslautern (DE)

(73) Assignee: FRAUNHOFER-GESELLSCHAFT ZURE FÖRDERUNG DER ANGEWANDTEN FORSHUNG E.V., München (DE)

( * ) Notice: Subject to any disclaimer, the term of this patent is extended or adjusted under 35 U.S.C. 154(b) by 0 days.

(21) Appl. No.: 14/651,443

(22) PCT Filed: Dec. 5, 2013

(86) PCT No.: PCT/EP2013/075668
§ 371 (c)(1),
(2) Date: Jun. 11, 2015

(87) PCT Pub. No.: WO2014/095392
PCT Pub. Date: Jun. 26, 2014

(65) Prior Publication Data
US 2015/0318658 A1    Nov. 5, 2015

(30) Foreign Application Priority Data

Dec. 21, 2012 (DE) .......................... 10 2012 113 029

(51) Int. Cl.
*H01S 3/067* (2006.01)
*H01S 3/082* (2006.01)
(Continued)

(52) U.S. Cl.
CPC ............. *H01S 3/067* (2013.01); *H01S 3/06704* (2013.01); *H01S 3/06712* (2013.01);
(Continued)

(58) Field of Classification Search
CPC . H01S 3/067; H01S 3/10061; H01S 3/06704; H01S 3/06754; H01S 3/06712; H01S 3/1118; H01S 3/082; H01S 3/105; H01S 3/06729
See application file for complete search history.

(56) References Cited

U.S. PATENT DOCUMENTS

2009/0206263 A1   8/2009  Rahman
2011/0210252 A1   9/2011  Ouchi et al.
2012/0230353 A1   9/2012  Xu et al.

FOREIGN PATENT DOCUMENTS

DE    102 11 352 A1    9/2002
DE    101 30 845 A1    1/2003
(Continued)

OTHER PUBLICATIONS

Pajarola Set al: "Dual-polarization optical pulse generation using a mode-locked two-arm external cavity diode laser", Optics Communications, North-Holland Publishing Co. Amsterdam, NL, vol. 154, No. 1-3, Aug. 15, 1998.*

(Continued)

*Primary Examiner* — Dung Nguyen
(74) *Attorney, Agent, or Firm* — Drinker Biddle & Reath LLP (57) ABSTRACT

A short-pulse laser system for generating electromagnetic pulses includes: a first resonator having a first beam path and a first resonator length; a second resonator having a second beam path and a second resonator length; and an amplification medium. The amplification medium is arranged both in the first beam path of the first resonator and in the second beam path of the second resonator. The system and method for generating optical pulses enables the generation of a first and a second pulse with an adjustable time delay at high sampling rates. The first resonator of the system is designed such that it supports precisely one first polarization state of the electromagnetic pulses and the second resonator is designed such that it supports precisely one second polarization state. The first and second polarization states are orthogonal to one another and designed with lengths that are variable relative to one another.

16 Claims, 2 Drawing Sheets (51) Int. Cl.
*H01S 3/10* (2006.01)
*H01S 3/105* (2006.01)
*H01S 3/11* (2006.01)
*H01S 3/00* (2006.01)

(52) U.S. Cl.
CPC ............ *H01S3/06754* (2013.01); *H01S 3/082* (2013.01); *H01S 3/105* (2013.01); *H01S 3/10061* (2013.01); *H01S 3/1118* (2013.01); *H01S 3/0057* (2013.01); *H01S 3/06729* (2013.01)

(56) References Cited

FOREIGN PATENT DOCUMENTS

| DE | 602 08 168 T2 | 7/2006 |
| DE | 600 32 626 T2 | 5/2007 |
| DE | 10 2005 042 073 B4 | 11/2010 |
| DE | 10 2011 085 614 B4 | 6/2013 |
| JP | H05-45682 A | 2/1993 |
| WO | WO-02/23683 A2 | 3/2002 |
| WO | WO-02/47216 A2 | 6/2002 |

OTHER PUBLICATIONS

X. Cheng et al., "Intensity modulation of VCSELs under feedback with two reflectors and self-mixing interferometer", Optics Communications, 272 (2007) p. 420-424.

Xiu-Wei Fan et al., "An Intermittent Oscillation Dual-Wavelength Diode-Pumped Nd:YAG Laser", IEEE Journal of Quantum Electronics, vol. 43, No. 10. Oct. 2007, p. 884-888.

S. Pajarola et al., "Dual-polarization optical pulse generation using a mode-locked two-arm external cavity diode laser", Optics Communications 154 (1998) p. 39-p. 42.

B. N. Tyushkevich et al., "Generation of Double Laser Pulses upon a Single Photoelectric Switching of a Branched Anisotropic Cavity by an Electrooptic Shutter", Instruments and Experimental Techiniques, vol. 46, No. 5, 2003, p. 687-689.

* cited by examiner

SHORT-PULSE LASER SYSTEM

CROSS REFERENCE TO RELATED APPLICATIONS

This application is a National Stage of International Application No. PCT/EP2013/075668 filed Dec. 5, 2013, which claims benefit of German Patent Application No. 10 2012 113 029.9 filed Dec. 21, 2012, both of which are herein incorporated by reference in their entirety.

The present invention concerns a short-pulse laser system for generating electromagnetic pulses comprising a first resonator having a first beam path and a first resonator length, a second resonator having a second beam path and a second resonator length, and an amplification medium, wherein the amplification medium is arranged both in the first beam path of the first resonator so that it amplifies electromagnetic pulses in the first resonator and also in the second beam path of the second resonator so that it amplifies electromagnetic radiation in the second resonator.

The present invention further concerns a method of generating electromagnetic pulses.

The generation of short and ultra-short electromagnetic pulses is becoming of ever increasingly greater significance in science and technology. In that respect short electromagnetic pulses can be used for example for material processing, in which respect use is made of the fact that the entire energy of a pulse is distributed only over a very short period of time, typically around 100 fs, so that very high levels of power per pulse can be achieved.

Short-pulse laser systems however have also acquired particular significance in the field of spectroscopy where short electromagnetic pulses are used for the implementation of time-resolved excitation/retrieval experiments. In that case use is basically made of the fact that a physical system, for example a semiconductor material, is excited with a first pulse and the action of the exciting pulse is retrieved by means of a second pulse which is then typically short in relation to the reaction of the physical system.

An example of such an excitation/retrieval experiment is the measurement of charge carrier dynamics in a semiconductor material. In that case the material is excited with a first pulse, that is to say charge carriers are generated in the material, which alter the reflectivity or transmission of the material. When now a second short electromagnetic pulse impinges on the material then it is reflected to a greater or lesser degree in dependence on the number of charge carriers in the material. If the time delay between the exciting pulse and the retrieval pulse can be adjusted it is then possible to measure the charge carrier dynamic in the semiconductor material in time-resolved fashion.

In addition short-pulse laser systems are used in terahertz (THz) time domain spectroscopy. In that case an emitter emitting THz radiation is excited with a first pulse while a detector gated with a second short pulse samples or detects in time-resolved fashion the electromagnetic wave generated by the emitter. It is particularly noticeable in that respect that the actual field strength of the THz radiation emitted by the emitter can actually be detected in time-resolved fashion in that way. In that case THz time domain spectroscopy can also be considered as an excitation/retrieval experiment.

A prerequisite for the implementation both of excitation/retrieval experiments and also THz time domain spectroscopy is that short optical pulses are available, of which a respective first one is used for excitation and a second pulse which can be time-delayed in relation to the first pulse is available for retrieval.

In the state of the art such excitation/retrieval experiments are implemented for example by a short-pulse laser system emitting a short electromagnetic pulse which is then divided at a beam splitter into an excitation pulse and a retrieval pulse, in which case the retrieval pulse is displaced in time with respect to the excitation pulse by way of an adjustable delay section.

Such a delay section is frequently embodied by a linear displacement table with mirrors disposed thereon, which represents an optical path which is of variable length. To be able to provide higher sampling rates, the delay section is also frequently implemented by means of a mechanically oscillating system for rapid forward and backward movement of the mirror. It will be noted however that even such oscillation systems encounter their (mechanical) limits towards higher sampling rates.

To be able to implement even higher sampling rates, a short-pulse laser system for THz time domain spectroscopy is known from the state of the art, for example from Y Kim and D Yee "High-speed terahertz time-domain spectroscopy based on electronically controlled optical sampling", Optics Letters, Volume 35, No 22, November 2010, which system is based on two short-pulse lasers of which one generates the exciting pulse or the pulse driving the emitter, and the other generates the sampling pulse or the pulse gating the detector, wherein the time displacement between the two pulses is afforded by the resonator length of the one short-pulse laser being tunable around the resonator length of the other short-pulse laser. As the repetition rate or the time spacing between two successive pulses generated by a short-pulse laser is directly proportional to the resonator length it is possible in that way to tune the time displacement between the generating and the detecting electromagnetic pulses.

It has been found however that such a short-pulse laser system gives rise to markedly increased costs as there must be two short-pulse lasers. In addition further complications occur by virtue of the fact that two completely independent resonators or the resonator lengths thereof have to be tuned to each other and possibly stabilized.

In comparison therewith the object of the present invention is to provide a short-pulse laser system and a method of generating optical pulses, which permits the generation of a first and a second pulse with an adjustable time delay with high sampling rates. The invention further seeks to provide that the optical pulses are afforded with the smallest possible level of complication and expenditure.

At least one of the afore-mentioned objects is attained by a short-pulse laser system for generating electromagnetic pulses comprising a first resonator having a first beam path and a first resonator length, a second resonator having a second beam path and a second resonator length, and an amplification medium, wherein the amplification medium is arranged both in the first beam path of the first resonator so that it amplifies electromagnetic pulses in the first resonator and also in the second beam path of the second resonator so that it amplifies electromagnetic pulses in the second resonator, wherein the first resonator is so adapted that it supports precisely one first polarization state of the electromagnetic pulses and the second resonator is so adapted that it supports precisely one second polarization state, wherein the first and second polarization states are orthogonal to each other and wherein the first and second resonators are so adapted that the first and the second resonator lengths are variable relative to each other.

The aim of such a short-pulse laser system is to implement electromagnetic pulses of which a first pulse train can be used to excite a physical system and a second pulse train can be used to retrievally interrogate a physical system, wherein the system permits a rapid change in a time displacement between the first and the second pulse while the system also manages with as few components as possible.

The basic idea of the short-pulse laser system according to the invention in that respect is to use the amplification medium at the same time in two resonators for generating electromagnetic pulses so that two resonators manage with only one amplification medium.

The arrangement of the amplification medium simultaneously in the first and the second medium signifies in an embodiment in particular that the first and second beam paths in the amplification medium are spatially identical.

In addition the short-pulse laser system itself is so designed that the resonator lengths of the two resonators are variable relative to each other so that it is possible to set a time displacement between the pulses emitted by the two resonators. So that at the same time the greatest possible independence of the two resonators from each other is achieved and the pulses in particular do not influence each other in the amplification medium the two resonators are so designed that they support mutually orthogonal polarization states. Such mutually orthogonal polarization states are decoupled from each other in the amplification medium.

When in accordance with this application reference is made to mutually orthogonal or perpendicular polarization states that preferably means mutually orthogonal linear polarization states, but alternatively also left- and right-circular polarization states.

Electromagnetic pulses in accordance with this application can be pulses in the entire electromagnetic spectrum but preferably in the visible or infrared spectral range. In particular electromagnetic pulses of a wavelength around 1310 nm or around 1550 nm, that is to say in the telecommunication windows, at which optical components for fiber lasers are commercially available, have proven their worth.

When in accordance with this application reference is made to a short-pulse laser system or short electromagnetic pulses that is used to denote in particular pulses of a duration of less than 500 fs, preferably less than 200 fs and particularly preferably less than 100 fs.

In order to make the first and the second resonator lengths variable relative to each other a desirable embodiment of the present invention provides that at least the first resonator has a portion which is only in the first beam path and not in the second beam path.

In an embodiment of the invention the first resonator and/or the second resonator has a reflector which is driven moveably so that the resonator length is variable. For that purpose for example an end mirror of the first resonator or of the second resonator can be mounted on an oscillating mechanical system which then changes the resonator length in oscillating relationship. Alternatively the reflector could be mounted on a piezoelectric element which makes it possible to alter the mirror in its position in a short time so that the resonator length is adjustable and variable.

In an embodiment of the invention the first resonator and/or the second resonator has at least portion-wise a light wave guide whose length is variable so that the resonator length of the corresponding resonator is variable.

It will be appreciated that as an alternative to embodiments in which the length of the first or the second resonator is variable, embodiments are conceivable in which both resonator lengths are variable at the same time.

A possible way of varying an optical wave guide in its length is for example a mechanical apparatus which stretches the optical wave guide. Such apparatuses typically have a device on which a plurality of windings of the optical wave guide are wound, wherein the apparatus permits automatic stretching of the windings in one or more directions.

Alternatively a variation in the length of an optical wave guide can be effected for example by thermal action.

The term optical wave guides in the present invention is used to denote in particular optical fibers, preferably of glass. They are referred to hereinafter for brevity as optical fibers.

In an embodiment of the invention the short-pulse laser system includes a fiber laser. Such a fiber laser has on the one hand the advantage that its components are commercially available by virtue of the widespread use thereof in the field of optical telecommunication technology. On the other hand however in optical fibers with which such a fiber laser is embodied, the two mutually orthogonal polarization states of the two resonators can be easily guided without crosstalk occurring between the two channels formed by the mutually orthogonal polarization states.

For that purpose in an embodiment of the invention such a fiber laser is embodied by means of a polarization-maintaining optical fiber.

Polarization-maintaining optical fibers are optical fibers in which the polarization of linearly polarized light is maintained during propagation of the electromagnetic wave through the fiber. There is therefore no loss of optical power into the other polarization modes. Such fibers are sometimes also referred to as birefringent fibers.

The operating principle of polarization-maintaining optical fibers is typically based on the fact that the core of the polarization-maintaining fibers in cross-section does not have any isotropic properties, but has an extraordinary stress axis. If electromagnetic radiation is coupled into the fiber with a polarization parallel to that stress axis or also perpendicularly to that stress axis then that electromagnetic radiation preserves its polarization state during propagation in the fiber.

Such non-isotropic cores can be implemented in particular by the cladding of the fiber being deliberately of a non-rotationally symmetrical structure and thus by tensile or compressive stresses being exerted on the core, which lead to an isotropy of the core in cross-section. Examples of polarization-maintaining optical fibers are so-called Panda fibers, Bow-tie fibers and elliptical-clad fibers.

In such a polarization-maintaining fiber the two modes of the first and second resonators of the short-pulse laser system can propagate independently of each other.

In an embodiment the short-pulse laser system includes a fiber laser. In a fiber laser the amplification medium is formed by the optical fiber itself.

In an embodiment of the invention the fiber laser has a polarization beam splitter so that within the short-pulse laser system two beam paths which are spatially separate from each other of the first or the second resonator are produced with mutually perpendicular polarization.

Such polarization beam splitters which are also available in particular as optical-fiber components split light introduced into same in accordance with its polarization components. If two mutually orthogonal polarization states are propagated independently of each other then a polarization beam splitter is capable of dividing them into two spatially separate channels. In that way portions of the first and the second resonator can be easily embodied, which are disposed only in the first beam path or only in the second beam path, in which therefore the two beam paths of the two resonators are spatially separated from each other. In those parts of the first and second resonators changes in the resonator length of one of the two resonators then lead to a relative change in length between the first resonator length and the second resonator length.

In an embodiment of the invention the short-pulse laser system has a fiber amplifier disposed in the first and/or the second beam path, wherein preferably an output of the fiber laser is connected to the fiber amplifier. In that way the electromagnetic pulses generated in the fiber laser of the short-pulse laser system, of at least one of the resonators, can be post-amplified and thus raised in its power to a level such as to permit effective implementation of experiments or driving of a THz spectrometer.

In that respect it is possible that the pulses of the first resonator and the second resonator are also propagated in the fiber amplifier in spatially overlapping relationship or in spatially identical fashion and are post-amplified independently of each other by virtue of their orthogonal polarization states. It will be noted however that embodiments are also possible, in which only the pulses from one of the resonators are post-amplified. For example, for a THz time domain spectrometer, it may be desirable if pulses which were generated in the first resonator and which are passed on to a generator for electromagnetic radiation in the THz frequency range are post-amplified while pulses which were generated in the second resonator and passed on to a detector for electromagnetic radiation in the THz frequency range are not post-amplified.

In an embodiment of the invention the short-pulse laser system has an output with a polarization beam splitter so that outside the short-pulse laser system two beam paths with mutually orthogonal polarization are produced.

At this location, that is to say at the output of the short-pulse laser system, a polarization beam splitter serves to spatially separate from each other the two mutually perpendicular polarization states which are propagated within the short-pulse laser system, that is to say in particular before the output thereof, along the spatially overlapping first and second beam paths of the first and second resonators, so that the one pulses can be used for excitation of a physical system and the other pulses can be used for retrieval interrogation thereof.

In an embodiment of the invention the first and second resonators each have a saturable absorber in order to generate short and in particular ultra-short electromagnetic pulses.

In addition at least one of the above-mentioned objects is also attained by an optical excitation/retrieval arrangement having a short-pulse laser system as was described above.

In an embodiment of the invention the optical excitation/retrieval arrangement is so adapted that pulses which were generated in the first resonator are passed to a physical system for excitation thereof and pulses which were generated in the second resonator are passed to said physical system for retrieval thereof.

In an embodiment of the invention such an optical excitation/retrieval arrangement is a THz time domain spectrometer which is so adapted that pulses which were generated in the first resonator are passed to a generator for electromagnetic radiation in the THz frequency range and pulses which were generated in the second resonator are passed to a detector for electromagnetic radiation in the THz frequency range.

Such generators and detectors for electromagnetic radiation in the THz frequency range which are either operated with optical pulses or gated thereby are in particular non-linear optical crystals and so-called photoconductive switches based on semiconductor components.

At least one of the above-mentioned objects is also attained by a method of generating electromagnetic pulses comprising the steps:

providing a first resonator having a first beam path and a first resonator length, providing a second resonator having a second beam path and a second resonator length, and providing precisely one amplification medium both in the first beam path of the first resonator so that an electromagnetic pulse is amplified in the first resonator and also in the second beam path of the second resonator so that an electromagnetic pulse is amplified in the second resonator, supporting precisely one first polarization state in the first resonator, and supporting precisely one second polarization state in the second resonator, wherein the first and second polarization states are orthogonal to each other, and varying the first and second resonator lengths relative to each other.

Insofar as hereinafter aspects of the invention were described in relation to the short-pulse laser system then they also apply to the corresponding method of generating electromagnetic pulses and vice-versa. If the method is performed with a short-pulse laser system according to this invention it has the corresponding devices for same. In particular embodiments of the short-pulse laser system are suitable for carrying out the method of generating electromagnetic pulses.

Further advantages, features and possible uses of the present invention will be apparent from the description hereinafter of an embodiment and the related Figures.

In the Figures identical elements are denoted by identical references.

Figure 1:
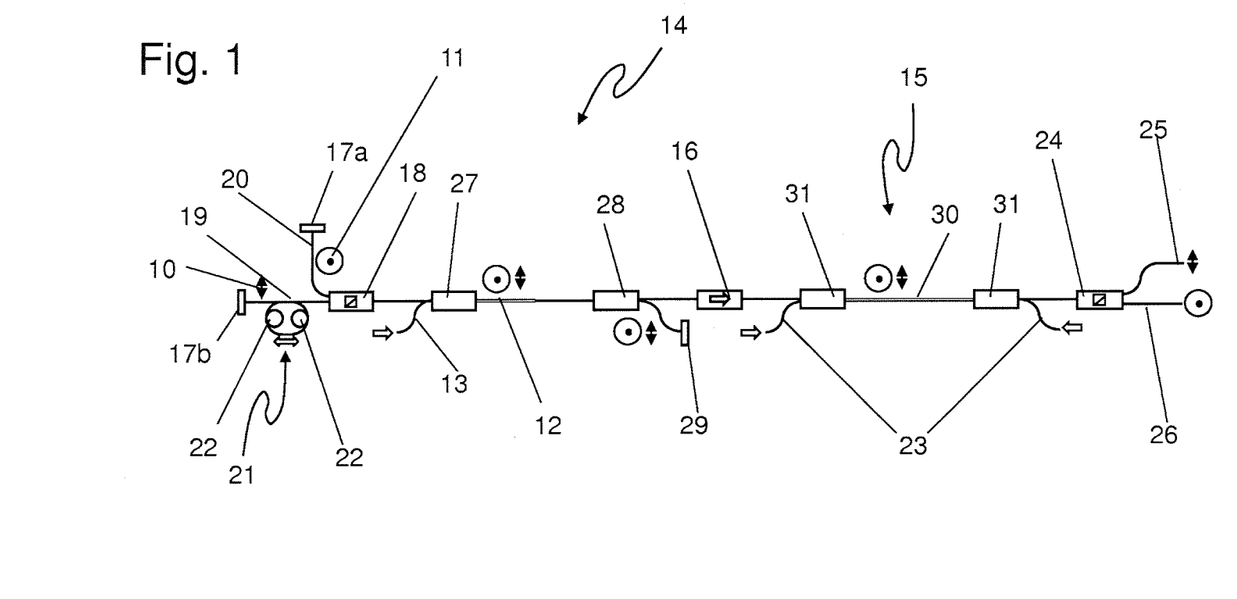
FIG. 1 shows a diagrammatic view of an embodiment of a short-pulse laser system according to the present invention.

The short-pulse laser system according to an embodiment of this invention, shown in FIG. 1, is based on optical fibers which are designed for operation at a wavelength of 1.55 μm.

The optical fibers used are so-called polarization-maintaining fibers with a core to which stresses are targetedly applied in one direction by a specific configuration of the cladding of the fibers. In that way electromagnetic radiation which is coupled into those fibers parallel or perpendicularly to the preferential direction is propagated without any proportions of the radiation worth mentioning being transferred during propagation through the fiber from one polarization state into the other. The same also applies to the propagation of left- or right-circular polarization states. In other words, in such polarization-maintaining fibers there is no crosstalk between the two channels formed by the mutually orthogonal polarization states.

Figure 2A:
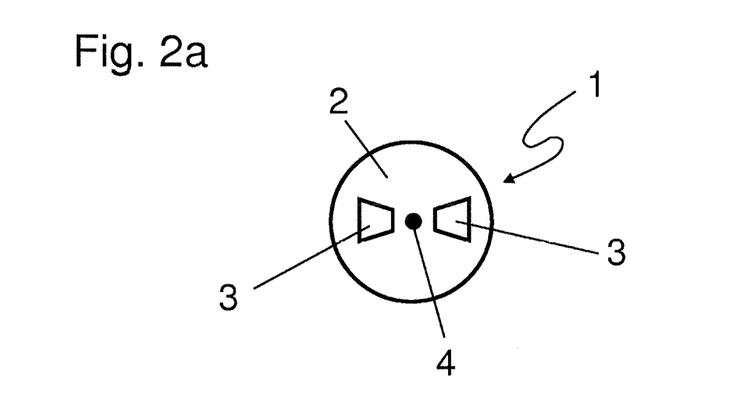
FIGS. 2a through 2c show embodiments of polarization-maintaining optical fibers.
Figure 2B:
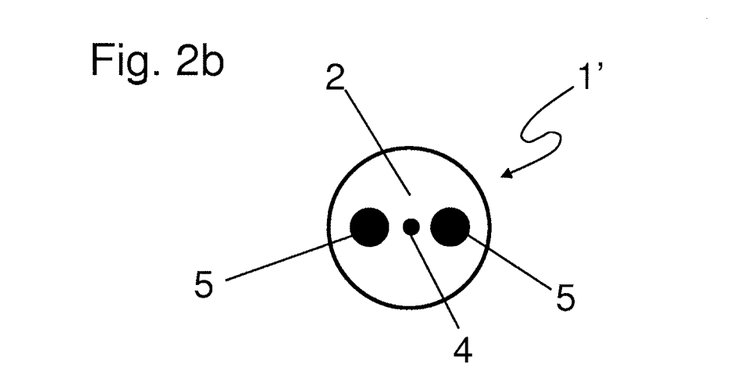
Figure 2C:
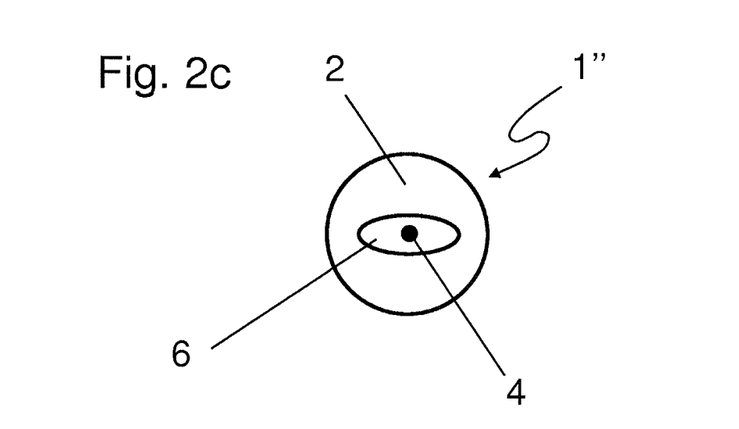

FIGS. 2a through 2c show examples of such polarization-maintaining fibers as can alternatively be used for the structure of the fiber laser system of FIG. 1. In this respect FIG. 2a shows a so-called Bow-tie fiber 1 in which two structures 3 are introduced into the fiber cladding 2, the structures together with the core 4 being reminiscent of a bow tie (article of clothing) in the sectional view. The two structures 3 in the cladding 2 of the fiber 1 provide that the core 4 which is embedded centrally in the cladding 2 has an extraordinary axis into which for example linearly polarized electromagnetic radiation can be coupled in polarization-maintaining fashion.

FIG. 2b shows an alternative embodiment of such a polarization-maintaining optical fiber 1' which is referred to as a Panda fiber. To build up a corresponding stress in the core 4 two glass rods 5 are let into the cladding 2 of the optical fiber 1, the rods having approximately the same effect as the bow tie-like structures 3 of the fiber 1 of FIG. 2a.

FIG. 2c shows a third embodiment of a polarization-maintaining optical fiber 1" in which the core 4 is embedded within the cladding 2 into an elliptical structure 6 which imparts the necessary anisotropic stress to the core 4. Such a polarization-maintaining optical fiber 1" is also referred to as an elliptical-clad fiber.

By virtue of the configuration of all fiber components of the short-pulse laser system of FIG. 1 in the form of polarization-maintaining fibers the short-pulse laser system of FIG. 1 has two partially co-propagating optical channels formed by two mutually orthogonal polarizations. Although they at least portion-wise co-propagate those two channels are separated from each other in such a way that they do not experience any mutual influencing and they do not involve any crosstalk between the two channels. In other words both channels in principle form mutually independent lasers in a single system. In particular both channels are amplified independently of each other.

For the sake of simplicity it is assumed hereinafter that the two channels are formed by linearly polarized electromagnetic radiation, the two channels having mutually orthogonal linear polarizations. In FIG. 1 those mutually orthogonal linear polarizations are characterised by an arrow 10 and a dot 11 arranged centrally in a circle. Where the arrow and the dot arranged in the circle are both shown together, that means that both channels co-propagate in the same fiber portion while at another location in the short-pulse laser system only one of the two polarizations is present in the respective fiber portion.

The illustrated short-pulse laser system comprises two portions, namely the fiber laser 14 and the downstream disposed amplifier 15. The laser 14 itself in turn has two resonators which have a common beam splitter 28 as a coupling-out means, a common end mirror 29 and a respective end mirror 17a, 17b for the two polarization channels of the laser 14.

The beam splitter 28 is so adapted that only a small proportion of the power of the laser pulses oscillating in the resonators, in the present case 3% of the power coupled into the beam splitter 28, is coupled out of the fiber laser 14. The predominant proportion of the power remains in the resonators and is reflected back by the end mirror 29.

The amplification medium is formed by a fiber portion 12 which is pumped by means of an optical pump 13 to be able to provide the necessary amplification of the radiation oscillating in the laser 14. The pump radiation 13 is coupled into the amplifying fiber portion 12 by means of a wavelength multiplex fiber coupler 27.

While both polarization modes co-propagate in the same fiber of the laser 14 within a fiber portion between the end mirror 29 and a polarizing beam splitter 18 the two polarization channels are spatially separated from each other downstream of the polarization beam splitter 18, that is to say they are guided there in two mutually different fiber portions 19 and 20 respectively. As the fiber portion between the polarizing beam splitter 18 and the end mirror 29 of both polarization channels is of exactly equal length the difference in length between the fiber portions 19, 20 in which the polarization modes are spatially separated from each other determines the difference in the repetition rate or repeat frequency of the pulses of the two resonators downstream of the coupling-out means 28.

The core portion of the illustrated fiber laser 14 is the oscillator in which both polarization modes 10, 11 simultaneously propagate in the same fiber and which is pumped by an optical pump 13 so that the electromagnetic radiation experiences amplification in the fiber.

To achieve amplification of the radiation oscillating in the fiber the fiber portion 12 is at least portion-wise doped with rare earth ions. In the illustrated embodiment the fiber portion 12 is erbium-doped so that this gives an emission wavelength for the fiber laser of approximately 1.55 µm.

The aim of the short-pulse laser system according to the invention is to be able to rapidly match the length difference and thus the repetition rate of the one resonator in relation to the other resonator. For that purpose the fiber portion 19 in which in the illustrated embodiment a polarization mode 11 is guided, which is perpendicular to the sheet of the drawing of FIG. 1, has a fiber stretcher 21. That fiber stretcher 21 comprises two support posts 22 which are adjustable and variable in their spacing by means of a piezoelement. Passed around the two support posts 22 are a plurality of fiber loops of the portion 19 so that a movement of the two support posts 22 away from each other leads to a noteworthy change in the length of the fiber portion 19 and thus a change in the repetition rate of that resonator, the polarization mode of which is propagated in the fiber portion 19 downstream of the polarization beam splitter 18.

The two end mirrors 17a, 17b of the resonators for the two mutually perpendicular polarization modes are in the form of saturable absorbers to support the generation of short electromagnetic pulses. In that respect the saturable absorbers 17a, 17b serve as passive optical switching elements and thus for passive Q-switching of the two laser resonators. The saturable absorbers comprise a material which an intensity-dependent absorption coefficient. In the illustrated embodiment the saturable absorbers are semiconductor components, namely a SESAM (semiconductor saturable absorber mirror) which serves both as a saturable absorber and also as a reflector or mirror. The material of the saturable absorber becomes reflecting only when a given intensity threshold is reached so that the laser begins to oscillate only upon the attainment of a high inversion within the amplification medium and then the entire inversion is cleared with a short high-power pulse. The saturable absorber then switches the quality of the resonator to below the laser threshold again so that a high population inversion can be built up again in the amplification medium 12.

The amplifier 15 which is connected downstream of the actual laser 14 and which is also pumped with an optical pump 23 amplifies the short pulses generated in the resonators of the laser 14 in a fiber portion 30 in the form of the amplification medium so that they again attain a higher level of power. Both polarization modes are also co-propagated in the same fiber in the fiber amplifier 14 or its amplification medium 30.

As in the fiber laser 14, the pump radiation 23 is also coupled into and out of the amplifying fiber 30 by way of two wavelength multiplex fiber couplers 31 in the fiber amplifier 15.

In addition, disposed between the fiber laser 14 and the fiber amplifier 15 is an optical diode 16 which prevents feedback of electromagnetic radiation out of the amplifier 15 into the laser 14.

The output of the fiber amplifier 15 and thus the short-pulse laser system is formed by a polarization beam splitter 24 which divides the two polarization channels of the short-pulse laser system to two spatially separate channels. Those two outputs 25, 26 of the short-pulse laser system can then be used to provide an optical system with an excitation pulse and a retrieval pulse 26.

In the illustrated embodiment a photoconductive switch (not shown) is switched by means of the first output 25 to generate electromagnetic radiation in the THz frequency range and the second output 26 of the short-pulse laser system gates an associated receiving antenna for the THz radiation so that the electrical field of the THz radiation produced by the pulse of the first output is sampled in time-resolved fashion.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word "have" does not exclude other elements or steps and the indefinite article "a" does not exclude a plurality. The mere fact that certain features are claimed in different claims does not exclude the combination thereof. References in the claims are not to be deemed to be a limitation on the scope of protection.

LIST OF REFERENCES 1, 1', 1" polarization-maintaining fiber
2 cladding
3 structures
4 core
5 glass rods
6 elliptical structure
10 first polarization state
11 second polarization state
12 amplifying fiber portion of the fiber laser 14
13, 23 pump
14 fiber laser
15 fiber amplifier
16 optical diode
17a, 17b end mirror
18, 24 polarization beam splitter
19, 20 fiber portions
21 fiber stretcher
22 support posts
25 first output (excitation pulse)
26 second output (retrieval pulse)
27 wavelength multiplex fiber coupler of the fiber laser 14
28 beam splitter as coupling-out means of the fiber laser 14
29 end mirror of the fiber laser 14
30 amplifying fiber portion of the fiber amplifier 15
31 wavelength multiplex fiber coupler of the fiber amplifier 15

The invention claimed is:

1. A short-pulse laser system for generating electromagnetic pulses comprising:
a first resonator having a first beam path and a first resonator length;
a second resonator having a second beam path and a second resonator length; and
an amplification medium,
wherein the amplification medium is arranged both in the first beam path of the first resonator so that it amplifies electromagnetic pulses in the first resonator and also in the second beam path of the second resonator so that it amplifies electromagnetic pulses in the second resonator,
wherein the first resonator is so adapted that it supports precisely one first polarization state of the electromagnetic pulses and the second resonator is so adapted that it supports precisely one second polarization state, wherein the first and second polarization states are orthogonal to each other,
wherein the first and second resonators are so adapted that the first and the second resonator lengths are variable relative to each other, and
wherein a fiber amplifier is disposed in the first and/or in the second beam path.

2. A short-pulse laser system for generating electromagnetic pulses according to claim 1, wherein the first resonator or the second resonator has a portion which is disposed only in the one beam path and not in the other beam path so that one of the resonator lengths is variable independently of the other resonator length.

3. A short-pulse laser system for generating electromagnetic pulses according to claim 1, wherein the first resonator or the second resonator has a reflector which is driven moveably so that the resonator length is variable.

4. A short-pulse laser system for generating electromagnetic pulses according to claim 1, wherein the first resonator or the second resonator has at least portion-wise a light wave guide whose length is variable so that the first resonator length is variable.

5. A short-pulse laser system for generating electromagnetic pulses according to claim 1, wherein the short-pulse laser system includes a fiber laser having a polarization-maintaining optical fiber.

6. A short-pulse laser system for generating electromagnetic pulses according to claim 5, wherein the fiber laser has a polarization beam splitter so that within the short-pulse laser system two beam paths which are spatially separate from each other of the first and the second resonator are produced with mutually perpendicular polarization.

7. A short-pulse laser system for generating electromagnetic pulses according to claim 1, wherein the short-pulse laser system has an output with a polarization beam splitter so that outside the short-pulse laser system two beam paths with mutually orthogonal polarization are produced.

8. A short-pulse laser system for generating electromagnetic pulses according to claim 1, wherein the first and the second resonator each have a respective saturable absorber.

9. An optical excitation/retrieval arrangement having a short-pulse laser system according to claim 1.

10. An optical excitation/retrieval arrangement according to claim 9, wherein the optical excitation/retrieval arrangement is so adapted that pulses which were generated in the first resonator are passed to a physical system for excitation thereof and pulses which were generated in the second resonator are passed to said physical system for retrieval thereof.

11. An optical excitation/retrieval arrangement according to claim 9, wherein the optical excitation/retrieval arrangement is so adapted that pulses which were generated in the first resonator are passed to a generator for electromagnetic radiation in the THz frequency range and pulses which were generated in the second resonator are passed to a detector for electromagnetic radiation in the THz frequency range.

12. A method of generating electromagnetic pulses comprising the steps:
providing a first resonator having a first beam path and a first resonator length;

providing a second resonator having a second beam path and a second resonator length;
providing precisely one amplification medium both in the first beam path of the first resonator so that an electromagnetic pulse is amplified in the first resonator and also in the second beam path of the second resonator so that an electromagnetic pulse is amplified in the second resonator;
supporting precisely one first polarization state in the first resonator;
supporting precisely one second polarization state in the second resonator, wherein the first and second polarization states are orthogonal to each other;
varying the first and second resonator lengths relative to each other; and
providing a fiber amplifier disposed in the first and/or in the second beam path.

13. A short pulse laser system for generating electromagnetic pulses comprising:
a first resonator having a first beam path and a first resonator length;
a second resonator having a second beam path and a second resonator length; and
an amplification medium,
wherein the amplification medium is arranged both in the first beam path of the first resonator so that it amplifies electromagnetic pulses in the first resonator and also in the second beam path of the second resonator so that it amplifies electromagnetic pulses in the second resonator,
wherein the first resonator is so adapted that it supports precisely one first polarization state of the electromagnetic pulses and the second resonator is so adapted that it supports precisely one second polarization state, wherein the first and second polarization states are orthogonal to each other,
wherein the first and second resonators are so adapted that the first and the second resonator lengths are variable relative to each other,
wherein the short pulse laser system includes a fiber laser having a polarization-maintaining optical fiber, and
wherein the fiber laser has a polarization beam splitter so that within the short-pulse laser system two beam paths which are spatially separate from each other of the first and second resonator are produced with mutually perpendicular polarization.

14. A method for generating electromagnetic pulses comprising the steps:
providing a first resonator having a first beam path and a first resonator length;
providing a second resonator having a second beam path and a second resonator length;
providing precisely one amplification medium both in the first beam path of the first resonator so that an electromagnetic pulse is amplified in the first resonator and also in the second beam path of the second resonator so that an electromagnetic pulse is amplified in the second resonator,
supporting precisely one first polarization state in the first resonator;
supporting precisely one second polarization state in the second resonator, wherein the first and second polarization state are orthogonal to each other;
varying the first and second resonator lengths relative to each other;
providing a fiber laser having a polarization maintaining optical fiber; and
providing the fiber laser with a polarization beam splitter so that within the short pulse laser system two beam paths which are spatially separate from each other of the first and second resonator are produced with mutually perpendicular polarization.

15. An optical excitation/retrieval arrangement having a short pulse laser system for generating electromagnetic pulses comprising:
a first resonator having a first beam path and a first resonator length;
a second resonator having a second beam path and a second resonator length; and
an amplification medium,
wherein the amplification medium is arranged both in the first beam path of the first resonator so that it amplifies electromagnetic pulses in the first resonator and also in the second beam path of the second resonator so that it amplifies electromagnetic pulses in the second resonator,
wherein the first resonator is so adapted that it supports precisely one first polarization state of the electromagnetic pulses and the second resonator is so adapted that it supports precisely one second polarization state wherein the first and second polarization states are orthogonal to each other,
wherein the first and second resonators are so adapted that the first and the second resonator lengths are variable relative to each other,
wherein the optical excitation/retrieval arrangement is so adapted that pulses which were generated in the first resonator are passed to a physical system for excitation thereof and pulses which were generated in the second resonator are passed to said physical system for retrieval thereof,
wherein the short pulse laser system includes a fiber laser having a polarization maintaining optical fiber, and
wherein the fiber laser has a polarization beam splitter so that within the short pulse laser system two beam paths which are spatially separate from each other of the first and second resonator are produced with mutually perpendicular polarization.

16. A method to run an optical exciting/retrieving arrangement comprising the steps:
providing a first resonator having a first beam path and a first resonator length;
providing a second resonator having a second beam path and a second resonator length;
providing precisely one amplification medium both in the first beam path of the first resonator so that an electromagnetic pulse is amplified in the first resonator and also in the second beam path of the second resonator so that an electromagnetic pulse is amplified in the second resonator;
supporting precisely one first polarization state in the first resonator;
supporting precisely one second polarization state in the second resonator, wherein the first and second polarization state are orthogonal to each other;
varying the first and second resonator lengths relative to each other;
passing pulses which were generated in the first resonator to a physical system for excitation thereof;
passing pulses which were generated in the second resonator to said physical system for retrieval thereof; and
generating the electromagnetic pulses with a fiber laser having a polarization maintaining optical fiber, wherein the two polarization states of the first and second resonator which are orthogonal to each other, are propagating independently within the polarization maintain optical fiber wherein the fiber laser is provided with a polarization beam splitter so that within the short pulse laser system two beam paths which are spatially separate from each other of the first and second resonator are produced with mutually perpendicular polarization.

\* \* \* \* \*